US006910293B1

(12) United States Patent
Armstrong et al.

(10) Patent No.: US 6,910,293 B1
(45) Date of Patent: Jun. 28, 2005

(54) ADVERTISING PANEL FOR CONVEYOR

(76) Inventors: Stephen Armstrong, 206 State Hwy. 50, Brown's Plaza, Corbin City, NJ (US) 08270; Ronald Irvin, 110 Roosevelt Blvd., Suite 104, Marmora, NJ (US) 08223; Charles D. Landes, 110 Roosevelt Blvd., Suite 104, Marmora, NJ (US) 08223

( * ) Notice: Subject to any disclaimer, the term of this patent is extended or adjusted under 35 U.S.C. 154(b) by 125 days.

(21) Appl. No.: 10/612,425

(22) Filed: Jul. 2, 2003

(51) Int. Cl.[7] ............... G09F 19/22; G09F 23/00; B65G 47/00
(52) U.S. Cl. ............................. 40/524; 198/502.1
(58) Field of Search ................ 40/472, 524–528; 198/804, 502.1, 8.22

(56) References Cited

U.S. PATENT DOCUMENTS

| | | |
|---|---|---|
| 3,849,918 A | 11/1974 | Mazzocco, Sr. |
| 4,979,591 A | 12/1990 | Habegger et al. |
| 5,165,526 A | 11/1992 | Conklin, Jr. |
| 5,244,080 A | 9/1993 | Bierbaum |
| 5,280,831 A | 1/1994 | Conklin, Jr. |
| 5,311,980 A | 5/1994 | Munkner et al. |
| 5,358,094 A | 10/1994 | Molinaro et al. |
| 6,044,961 A | 4/2000 | Hine |
| 6,186,314 B1 | 2/2001 | Conklin, Jr. |
| 6,260,693 B1 | 7/2001 | Mohr |

FOREIGN PATENT DOCUMENTS

| | | |
|---|---|---|
| EP | 0 478 866 A1 | 4/1992 |
| EP | 0 675 846 B1 | 8/2000 |
| WO | WO 93/03472 | 2/1993 |
| WO | WO 93/12020 | 6/1993 |
| WO | WO 94/14689 | 7/1994 |

Primary Examiner—Cassandra Davis
(74) Attorney, Agent, or Firm—Norman E. Lehrer

(57) ABSTRACT

An advertising panel system for a conveyor of the type comprised of a series of substantially identically shaped plates which move in a closed path. The system includes a plurality of advertising panels having substantially the same shape as the conveyor plates. Each panel includes a base carrier sheet having a lower surface and an upper surface, a transparent cover sheet having a lower surface and an upper surface and an advertising sheet interposed between the base carrier sheet and the transparent cover sheet. An adhesive on the lower surface of the base carrier connects the advertising panel to the conveyor plate. A plurality of apertures pass through the three sheets of each panel and connectors secure the sheets together. The connectors are comprised of a T-nut that passes upwardly from the lower surface of the base carrier sheet and a screw that passes downwardly through the upper surface of the cover sheet and is threaded into the T-nut. This allows the cover sheet to be removed and reattached whenever it is desired to replace the advertising sheet.

5 Claims, 2 Drawing Sheets

ADVERTISING PANEL FOR CONVEYOR

BACKGROUND OF THE INVENTION

The present invention is directed toward an advertising panel for a conveyor and more particularly, toward an advertising panel that requires no modification to an existing conveyor base plates and which allows the advertising copy to be easily and quickly changed.

Conveyors for carrying items from one location to another location are well-known in the art. These conveyors are often configured as endless, essentially circular dispensing apparatus and are frequently used, for example, for transporting baggage at airports. Such conveyors are often called carousels because the baggage is placed onto plates or panels of the conveyor from a centrally located distributing point making the baggage available to the passengers around the periphery of the apparatus at a remote location.

Two general types of carousel conveyor apparatus are known and in wide use. The first utilizes rectangularly shaped plates while the other employs crescent shaped plates. Conveyors using rectangular plates are generally oval in shape with the rectangular panels overlapping and sloping downward toward the peripheral outer edge of the conveyor. The crescent panels are generally used on flat conveyors with an oval or a serpentine configuration.

Frequently, advertisements are placed on the center non-moving section of the carousel. These advertisements are often used to promote local business or to advertise car rental companies or different airlines. The advertising area is extremely limited since the people to whom the advertising is directed generally congregate in a limited number of specific positions around the carousel to retrieve their baggage. As a result, the audience sees only a small section of the total advertising that could be placed on the nonrotating section of the carousel.

In order to increase advertising space, advertisements can be placed directly on the moving conveyor plates. These plates provide a much larger advertising space. As a result, the advertisements can be viewed by everyone no mater where they may be assembled along the length of the conveyor.

Carousel advertisements are typically affixed to the conveyor plates either by an adhesive or using screws to pass through an overlying transparent sheet and into the conveyor plate. The use of screws in conventional systems requires modification to the conveyor plates in order to accept the same. On the other hand, the use of adhesives to affix the advertisements makes subsequent removal difficult and renders the advertisement difficult or impossible to reuse.

Systems have been proposed to improve the manner in which advertising may be carried by a carousel conveyor. U.S. Pat. No. 5,311,980, issued to Munkner et al., for example, discloses printing advertisements on sheets of polyethylene, or similar material, and affixing them directly to the conveyor plates by way of a pressure sensitive adhesive. One of the main disadvantages of such sheets, however, is their poor durability. Baggage carried on the conveyor tends to scratch and tear the sheet material. In addition, removal of sheet material from conveyor plates is time-consuming requiring either peeling off the sticker and removing the adhesive left behind or replacing the entire plate with a new panel with a new advertisement sheet. The same problem occurs when it is simply desired to change the advertisement even if the advertising sheet is not damaged.

U.S. Pat. No. 5,165,526 to Conklin Jr. discloses a conveyor system with conveyor panels that are constructed from transparent material. Each transparent conveyor panel has a viewable section and an overlapping section. An advertising sheet is affixed onto the underside of the viewable section of the transparent conveyor panel with an adhesive applied to the top surface of the advertising sheet. Conklin Jr. also discloses the use of ink that is hot stamped directly onto the transparent panels. As in the case of conveyor panels with decals for advertising material, advertising sheets glued to the transparent conveyor panels are difficult to remove limiting the reuse of these panels. Consequently, the entire panel must be removed from the conveyor belt and replaced with a new panel containing a new advertising sheet. Such a system is expensive and time-consuming. Obviously, when the advertising message is hot stamped directly onto the transparent panels, the transparent panel cannot be reused and must be replaced with a new panel having a new hot stamped message.

U.S. Pat. No. 5,280,831 to Conklin Jr. discloses a system for use with conveyors that includes a specially designed base belt plate instead of a conventional conveyor plate. The base plate includes a recess defined by spacers extending from at least two edges of the plate. An advertising sheet is affixed to the underside of a transparent cover with an adhesive and is then affixed by way of screws to the surface of the base plate within the recess. This method of changing advertising sheets is labor intensive. Similar arrangements are shown in Conklin, Jr.'s U.S. Pat. No. 6,186,314 and in U.S. Pat. No. 6,044,961. These arrangements, however, include means for holding the transparent cover in place without the use of screws or pins within the advertising field.

In U.S. Pat. No. 3,849,918 to Mazzocco, Sr. there is disclosed a continuous display device with display panels having a permanent portion and a removable portion. The permanent portion consists of an inner sheet of translucent or transparent plastic material. The removable portion consists of a pair of outer sheets of transparent material that form a pocket into which is inserted an advertising display sheet.

Other relevant systems can be seen in U.S. Pat. No. 4,979,591 to Habegger et al and U.S. Pat. No. 5,358,094 to Molinaro et al. The former discloses a conveyor belt with advertising indicia on a visible surface. A film of transparent plastic covers the visible surface to protect the advertising indicia. The later patent discloses a conveyor belt of the type to be used at checkout counters with advertisements that adhere to the conveyor belt through electrostatic attraction. Even further, U.S. Pat. No. 5,244,080 to Bierbaum discloses an information bearing belt conveyor with two layers. The top viewable layer has windows for receiving inserts with outlines of letters or figures. The shapes of the windows are complementary to the inserts.

All of the foregoing and other advertising systems for conveyors suffer from numerous disadvantages. In some cases, it is extremely difficult, time consuming and expensive to replace part or all of the advertising when necessary or desired. Other systems that make it easy to replace the advertising require extensive or expensive modifications to the conveyor system. There is, therefore, a need for an inexpensive advertising system that will stand up to abuse, that can be applied to conventional conveyor systems without modifying them and which allows for the quick and inexpensive changing of advertising copy.

SUMMARY OF THE INVENTION

The present invention is designed to overcome the deficiencies of the prior art discussed above. Accordingly, it is an object of the invention to provide an arrangement and a method of affixing advertisements to conveyor plates in such a way as to facilitate their installation and removal.

It is a further object of the present invention to provide an advertising system for a conveyor that can be secured to the plates of substantially any conveyer.

In accordance with the illustrative embodiments demonstrating features and advantages of the present invention, there is provided an advertising panel system for a conveyor of the type that includes a series of substantially identically shaped plates which move in a closed path. The system includes a plurality of advertising panels having substantially the same shape as the conveyor plates. Each panel includes a base carrier sheet having a lower surface and an upper surface, a transparent cover sheet having a lower surface and an upper surface and an advertising sheet interposed between the base carrier sheet and the transparent cover sheet. An adhesive on the lower surface of the base carrier connects the advertising panel to the conveyor plate. A plurality of apertures pass through the three sheets of each panel and connectors secure the sheets together. The connectors are comprised of a T-nut that passes upwardly from the lower surface of the base carrier sheet and a screw that passes downwardly through the upper surface of the cover sheet and is threaded into the T-nut. This allows the cover sheet to be removed and reattached whenever it is desired to replace the advertising sheet.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION OF THE PREFERRED EMBODIMENTS

Figure 1:
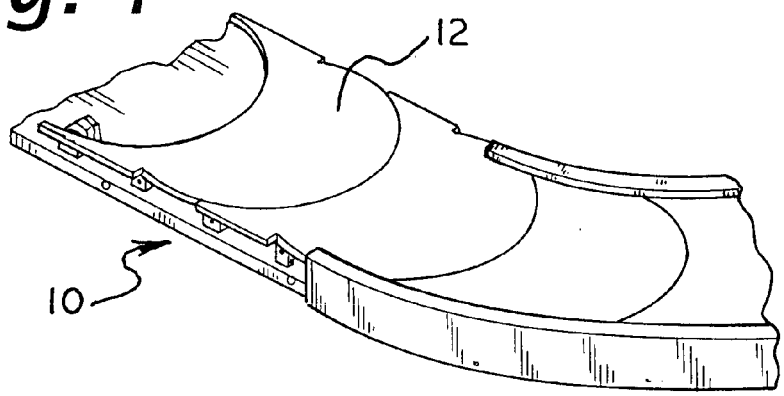
FIG. 1 is a perspective schematic representation of a conventional carousel conveyor utilizing crescent shaped plates.

Referring now to the drawings in detail wherein like reference numerals have been used throughout the various figures to designate like elements, there is shown in FIG. 1 a perspective view of a portion of a conventional carousel conveyor designated generally as 10. Conveyor 10 includes a plurality of substantially identically shaped crescent plates 12 which move along a closed path. The conveyor 10 may be of the type, for example, used in an airport to deliver baggage to waiting passengers.

The conveyor 10 is shown substantially schematically in FIG. 1 as the details thereof are well known to persons skilled in the field. Accordingly, it is not believed that a detailed discussion of the conveyor 10 or the manner in which it is constructed or operates is necessary. This is believed to be particularly true with respect to the present invention since the same is adapted to be applied directly to the plates 12 of the conveyor 10 without the need to make any modifications thereto.

Figure 2:
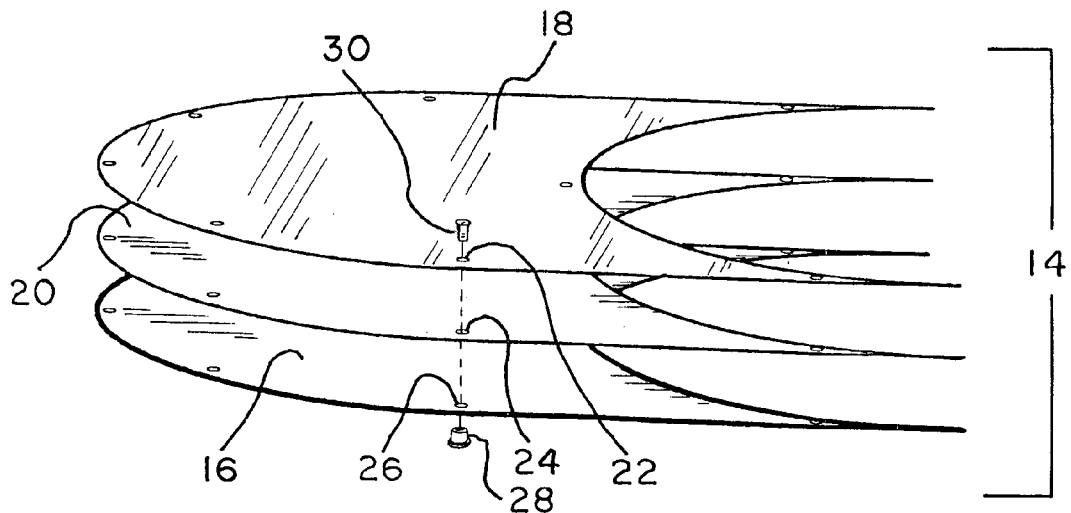
FIG. 2 is an exploded view of a first embodiment of the present invention schematically illustrating the various component parts thereof.

The advertising panel of the present invention which is to be applied to the plates 12 is shown in an exploded view in FIG. 2 and is designated generally as 14. The panel 14 includes a base carrier sheet 16 and a transparent cover sheet 18. An advertising sheet 20 is interposed between the base carrier sheet 16 and the transparent cover sheet 18.

As can be seen in FIG. 2, the three sheets 16, 18 and 20 all have substantially the same shape and dimensions with respect to their outer periphery. That is, and as explained hereinafter, the thickness dimensions of the three sheets may differ. Furthermore, the overall shape and dimensions of each of the sheets 16, 18 and 20 are substantially the same as the overall shape and dimensions of each of the plates 12 of the conveyor 10.

The base carrier sheet 16 is preferably made from a rigid plastic material having a thickness of approximately ¼ of an inch. The transparent cover sheet 18 is preferably made of a hard coat acrylic plastic such as sold under the trademark Lexan. Since the upper surface of the cover sheet 18 will be exposed to substantial wear, it should be made of a material that will not easily crack or scratch.

The advertising sheet 20 interposed between the base carrier sheet 16 and the transparent cover sheet 18 may be made of thin flexible paper or plastic film or the like. Furthermore, while the term "advertising" is being used, it should be readily apparent that the sheet 20 could be carrying a message or other information which may not necessarily be an actual advertisement. Furthermore, and as is well known in the art, a separate advertisement or similar indicia could be printed on each of the individual advertising sheets 20 or each sheet 20 could be part of a much larger advertisement wherein only a portion of the indicia is printed on each of the sheets 20 and the entire message is conveyed when the advertising panels are assembled in the proper order on the conveyor. Again, this aspect of the invention is well known in the art.

Each of the three sheets 16, 18 and 20 includes a plurality of apertures formed therein which are spaced around their peripheries as shown in FIG. 2. Furthermore, the apertures in each of the three sheets are in alignment with the similar apertures in the other two sheets. For example, aperture 22 is formed in the cover sheet 18, aperture 24 is formed in the advertising sheet 20 and aperture 26 is formed in the base carrier sheet 16. Connectors in the form of a T-nut 28 and a screw 30 connect the three sheets together through the apertures.

Figure 3:
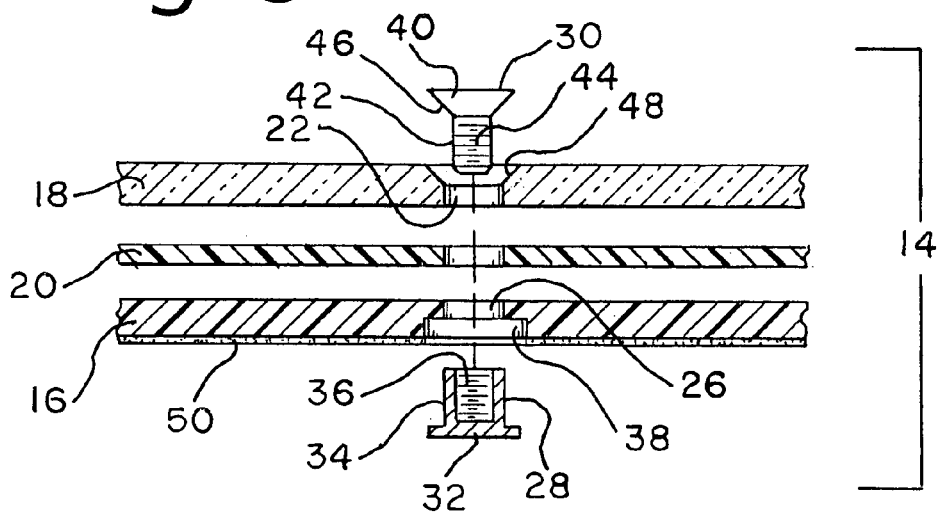
FIG. 3 is an enlarged exploded view showing the details of the manner in which the component parts of the invention are joined together.

As shown most clearly in FIG. 3, the T-nut 28 includes a head portion 32 and a cylindrical or tubularly shaped body portion 34. The inside of the body portion 34 is threaded as shown at 36. The outer dimension of the body portion 34 is configured so as to be insertable up through the aperture 26. As can be seen, the lower open end of the aperture 26 is enlarged as shown at 38 so that the head 32 of the T-nut 28 can fit therein thereby forming an essentially flush lower surface of the base carrier sheet 16. In this way, when the panel 14 is placed on a plate 12, the head 32 of the T-nut 28 rests on the plate.

Each screw 30 includes a head 40 and a body portion 42 having external threads 44 thereon. The head 40 includes a tapered or chamfered underside 46. In order to allow the top surface of the head 40 of each screw 30 to lie flush with the upper surface of the cover sheet 18, the aperture 22 in the cover sheet is chamfered as shown at 48 so as to be complementary to the chamfer 46 of the screw. Preferably, both the T-nut 28 and the screw 30 are made of nylon or similar durable material.

An adhesive 50 is applied to the lower surface of the base carrier sheet 16 so that the same can adhere to the conveyor plate 12. This can be done utilizing a double-face adhesive tape or by having the adhesive 50 applied to the lower surface of the sheet 16 and then covered with a release film or the like.

Figure 4:
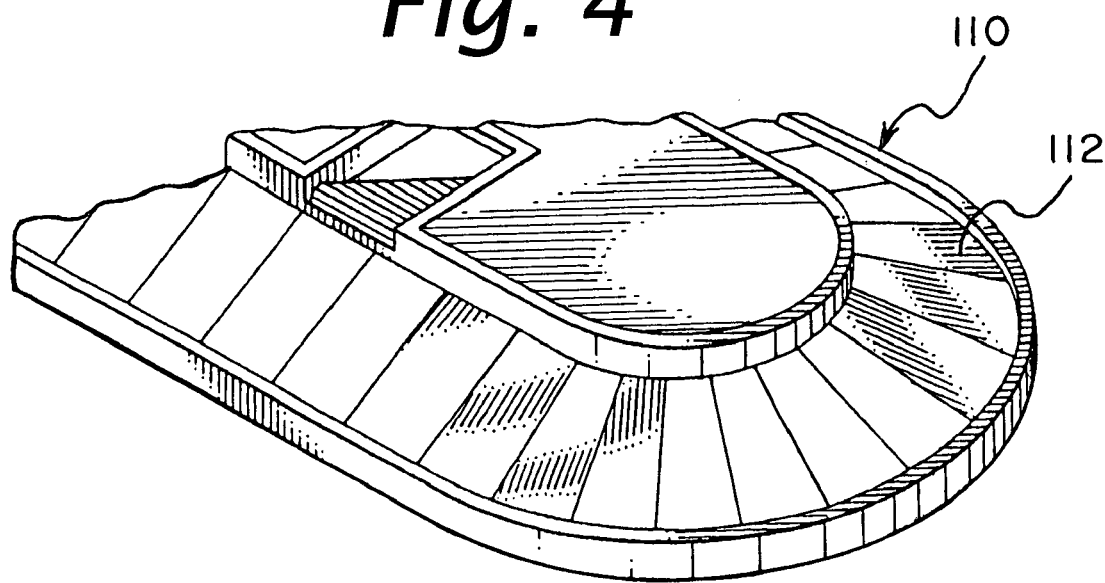
FIG. 4 is a perspective schematic representation of a conventional carousel conveyor utilizing rectangularly shaped plates.
Figure 5:
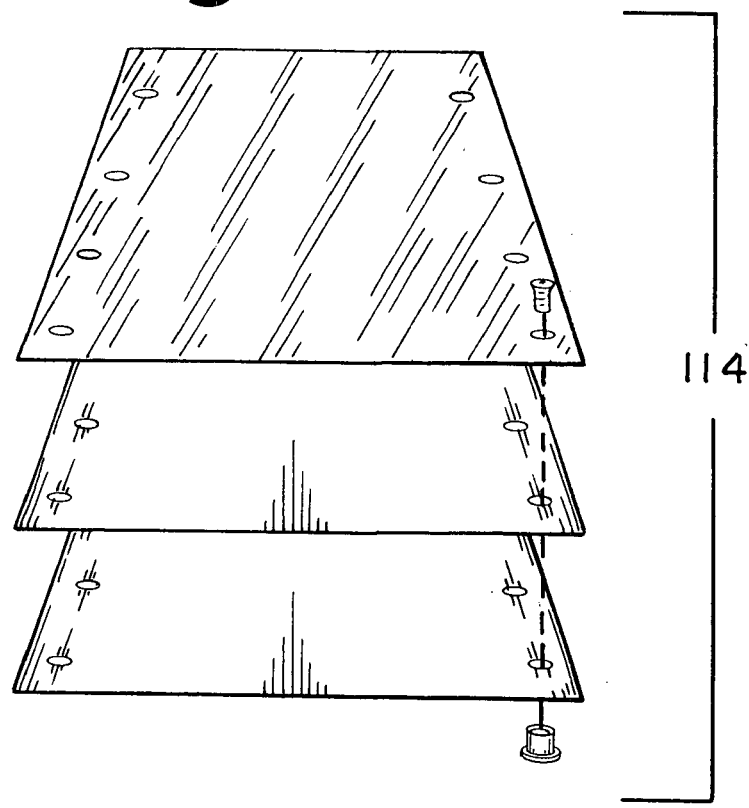
FIG. 5 is an exploded view of a second embodiment of the present invention useful with the conveyor of FIG. 4.

FIGS. 4 and 5 illustrate a second embodiment of the invention. FIG. 4 shows a conventional conveyor 110 having a plurality of substantially rectangularly shaped plates 112. The advertising panel 114 of the present invention is illustrated in FIG. 5 and as should be readily apparent to those skilled in the art, is constructed in essentially the same manner as the embodiment shown in FIGS. 1–3 discussed above. The only difference between the first and second embodiments is in the shape of the sheets that make up the advertising panel 114.

The advertising panel 14 (or 114) of the present invention is utilized in the following manner. With the adhesive 50 exposed, the base carrier sheet 16 is placed on the plate 12 and securely adhered thereto through the use of the adhesive. Prior to this being done, the T-nuts 28 are placed through the apertures 26 so as to extend upwardly. The heads 32 of the T-nuts rest on and are flush with the upper surface of the plate 12. The advertising sheet 20 is then placed on the base carrier sheet 16 and the transparent cover sheet 18 is placed over the advertising sheet 20. Screws 30 then secure the three sheets together. Obviously, the three sheets could be secured together to form the advertising panel 14 before the base carrier sheet 16 is adhered to the plate 12.

Should it ever be necessary or desirable to change the advertising sheet 20, all that is required is to remove the screws 30. The transparent cover sheet 18 is then taken off to expose the advertising sheet 20. That sheet can then be removed and replaced with a new advertising sheet. The transparent cover sheet 18 is reapplied and secured in place with the screws 30.

The present invention may be embodied in other specific forms without departing from the spirit or essential attributes thereof and accordingly, reference should be made to the appended claims rather than to the foregoing specification as indicating the scope of the invention.

We claim:

1. An advertising panel system for a conveyor comprised of a series of substantially identically shaped plates which move in a closed path, comprising:

a plurality of advertising panels, each of said panels being comprised of a base carrier sheet having a lower surface and an upper surface, a transparent cover sheet having a lower surface and an upper surface and an advertising sheet interposed between said base carrier sheet and said transparent cover sheet;

each of said sheets having substantially the same shape and dimension and having substantially the same shape and dimension as each of said plates;

each of said sheets further including a plurality of apertures formed therein and spaced around their peripheries with the apertures of each sheet being in alignment with the apertures in each of said other sheets of each advertising panel;

adhesive means securing each said base carrier sheet to one of said plates, and a plurality of connectors connecting said sheets together, each connector including a threaded nut having a head and a body, each connector further having a complimentary threaded screw having a head and a body, the bodies of said nut and screw passing through said apertures with said heads being substantially flush with said lower surface of said base carrier sheet and said upper surface of said cover sheet, respectively.

2. The advertising panel system for a conveyor as claimed in claim 1 wherein said body of said nut passes upwardly through aperture in said base carrier sheet and said advertising sheet and wherein the head of said nut rests on said plate.

3. The advertising panel system for a conveyor as claimed in claim 2 wherein said body of each said screw passes downwardly through one of said aperture in said transparent cover sheet and is threaded into the body of said nut, the head of each said screw being essentially flush with the upper surface of said cover sheet.

4. The advertising panel system for a conveyor as claimed in claim 3 wherein each said aperture in said cover sheet has a chamfered opening adjacent said upper surface thereof.

5. The advertising panel system for a conveyor as claimed in claim 4 wherein at least a portion of said screw head lies within said chamfered opening.

\* \* \* \* \*